United States Patent
Fastert et al.

(10) Patent No.: US 9,500,212 B2
(45) Date of Patent: Nov. 22, 2016

(54) BASE BODY AND FRAMEWORK SYSTEM

(75) Inventors: Claus Fastert, Drochtersen (DE);
Martin Röhrig, Hamburg (DE);
Manila Brandt, Nottensdorf (DE);
Carsten Barlag, Jever (DE)

(73) Assignee: Airbus Operations GmbH, Hamburg (DE)

(*) Notice: Subject to any disclaimer, the term of this patent is extended or adjusted under 35 U.S.C. 154(b) by 417 days.

(21) Appl. No.: 13/571,222

(22) Filed: Aug. 9, 2012

(65) Prior Publication Data

US 2013/0200225 A1 Aug. 8, 2013

Related U.S. Application Data (60) Provisional application No. 61/521,421, filed on Aug. 9, 2011.

(30) Foreign Application Priority Data

Aug. 9, 2011 (DE) .................... 10 2011 109 848

(51) Int. Cl.
*F16B 7/04* (2006.01)
*F16M 11/00* (2006.01)
*B29C 70/06* (2006.01)

(52) U.S. Cl.
CPC ............. *F16B 7/0493* (2013.01); *B29C 70/06* (2013.01); *F16M 11/00* (2013.01)

(58) Field of Classification Search
CPC ...... F16B 7/0493; F16M 11/00; B29C 70/06
USPC ............... 248/127, 298.1, 228.1; 156/173; 52/656.9, 710, 848; 264/239, 319; 403/400, 387, 231, 260
See application file for complete search history.

(56) References Cited

U.S. PATENT DOCUMENTS 3,022,802 A * 2/1962 Lewis .................... F16L 9/12
118/419

3,156,489 A * 11/1964 Deringer .............. F16L 23/08
138/109

(Continued)

FOREIGN PATENT DOCUMENTS

DE 05 35 10 625 A1 10/1986
DE 600 18 071 T2 11/2005

(Continued)

OTHER PUBLICATIONS

European Office Action for Application No. 12 005 773.2 dated Mar. 8, 2016.

(Continued)

*Primary Examiner* — Anita M King
(74) *Attorney, Agent, or Firm* — Jenkins, Wilson, Taylor & Hunt, P.A.

(57) ABSTRACT

The invention relates to a rod-shaped base body with at least one bearing surface which can be brought to bear against at least one counter-bearing surface of a bearing device for fastening to a further rod-shaped base body and/or a functional component for forming a framework. The rod-shaped base body can be a fiber-composite material, particularly carbon-fiber-reinforced plastic, and the rod-shaped base body has a recess as positioning mark determining the position of the further base body and/or the functional component in relation to the rod-shaped base body in the framework by the positive engagement due to the at least one bearing surface and at least one counter-bearing surface bearing against one another. The invention also includes a framework system having a rod-shaped base body of this type. The object of the invention is additionally achieved by a method for producing a rod-shaped base body of this type.

9 Claims, 8 Drawing Sheets

(56) References Cited

U.S. PATENT DOCUMENTS

| | | | | |
|---|---|---|---|---|
| 3,523,508 | A | * | 8/1970 | Maslow .................. 108/147.13 |
| 3,574,364 | A | * | 4/1971 | Langren ........................ 403/395 |
| 3,887,291 | A | * | 6/1975 | Langren ........................ 403/391 |
| 3,955,788 | A | * | 5/1976 | Delage ........................ 248/228.3 |
| 4,089,190 | A | * | 5/1978 | Worgan .................. F16C 3/026 138/130 |
| 4,583,359 | A | * | 4/1986 | Staeger ........................ 52/653.2 |
| 5,127,342 | A | * | 7/1992 | Taylor ...................... 108/147.13 |
| 5,129,672 | A | | 7/1992 | Hiromoto et al. |
| 5,481,842 | A | * | 1/1996 | Gautreau ...................... 52/656.9 |
| 5,638,870 | A | * | 6/1997 | Takada .................. B29C 70/085 138/125 |
| 5,649,768 | A | * | 7/1997 | Ohzono et al. ................. 384/43 |
| 6,113,042 | A | * | 9/2000 | Welsch et al. ............. 248/218.4 |
| 6,349,912 | B1 | * | 2/2002 | Schauss et al. ............ 248/298.1 |
| 6,561,473 | B1 | * | 5/2003 | Ianello ....................... 248/219.4 |
| 6,695,156 | B1 | * | 2/2004 | Wang ............................. 211/187 |
| 6,722,392 | B1 | | 4/2004 | David et al. |
| 6,748,878 | B2 | * | 6/2004 | Chen ........................ 108/147.13 |
| 7,931,420 | B2 | * | 4/2011 | Maffeis ........................ 403/400 |
| 8,678,207 | B2 | * | 3/2014 | Shimazaki et al. ........... 211/187 |
| 8,887,647 | B2 | * | 11/2014 | Sabounjian .............. 108/147.13 |
| 2006/0115321 | A1 | * | 6/2006 | Maffeis ......................... 403/253 |
| 2013/0200225 | A1 | | 8/2013 | Fastert et al. |

FOREIGN PATENT DOCUMENTS

| | | |
|---|---|---|
| DE | 10 2004 028 707 B4 | 1/2006 |
| DE | 10 2011 109 848 | 2/2013 |
| FR | 2 651 523 A1 | 3/1991 |
| JP | H0 257 325 A | 2/1990 |

OTHER PUBLICATIONS

Extended European Search Report for Application No. 12 005 773.2 dated Nov. 8, 2012.

European Office Action for Application No. 12 005 773.2 dated Jul. 7, 2015.

German Office Action for Application No. 10 2011 109 848.1 dated Oct. 22, 2015.

* cited by examiner

BASE BODY AND FRAMEWORK SYSTEM

CROSS-REFERENCE TO RELATED APPLICATIONS

This application claims the benefit of and priority to U.S. Provisional Application No. 61/521,421, filed Aug. 9, 2011 and German Patent Application No. 10 2011 109 848.1, filed Aug. 9, 2011, the entire disclosures of which are herein incorporated by reference.

TECHNICAL FIELD

The invention relates to a rod-shaped base body, particularly for arranging functional components, with at least one bearing surface which can be brought to bear against at least one counter-bearing surface of a bearing device for fastening to a further rod-shaped base body and/or a functional component for forming a framework. Further, the invention relates to a framework system having such a rod-shaped base body and also a method for producing such a rod-shaped base body.

BACKGROUND

A framework system of this type is known from DE 10 2004 028 707 B4, which is constructed for arranging toggle-lever clamping devices, suction devices, centring pins, sensors, welding devices, clinching devices, riveting devices, robot arms or the like in the automotive industry. The framework system according to DE 10 2004 028 707 B4 comprises two or a plurality of tubes as rod-shaped base bodies, which are cylindrical or polygonal at the outer envelope surface and which can be non-positively coupled to one another in different planes and/or at different angles by means of clamping collars. In this case, both the cylindrical or polygonal tubes and the clamping collars can be made of a fibre composite material.

SUMMARY

It is the object of the invention to provide a multi-purpose base body which can be used for building a framework system or for arranging functional components which can provide high positional accuracy and stability, particularly in the case of dynamic loads.

This object is achieved with the features of the independent patent claims. Further embodiments are specified in the sub-claims referring back thereto.

The solution of the object of the invention is based on a base body, particularly designed for both building a framework system and for arranging functional components. In this regard, the base body is designed for being used as functional component for constructing a framework for positioning a functional apparatus for building a functional system. In this regard, the base body according to the invention can be attached to another base body according to the invention in order to build such a framework, so that such a framework can comprise a plurality of base bodies according to the invention which are attached to each other. Further, a functional apparatus or several functional apparatuses can be mounted to a base body according to the invention. The functional apparatus in this regard can be a sensor device, like a laser, or an actuator device like an electrical motor. Further, one base body according to the invention can be part of a moveable arm or a moveable construction or a roboter arm or of a roboter. In particular, the base body can be a roboter arm to which a functional component like an actuator and/or a sensor device like a proximity sensor and/or a position sensor and/or a camera can be mounted. By at least one of these sensors the attitude and positioning of the base body can be controlled when the base body is moveably connected to a adjusting mechanism for adjusting the attitude and position of the base body. The functional component can also be a further base body according to the invention. In this regard, the base body is a multi-purpose base body.

The base body according to the invention is particularly rod-shaped and can in particular be formed a hollow body or as a body which is at least sectionally hollow. Thereby the base body is particularly suitable for building a light-weight framework or skeleton and for providing a light-weight arm for the above-mentioned purposes and advantages.

The base body according to the invention comprises a bearing device with at least one bearing surface which can be brought to bear against at least one counter-bearing device with a counter-bearing surface of at least one bearing device for fastening to a further rod-shaped base body according to the invention and/or for fastening or mounting a functional component like an apparatus, e.g. an actuator or a sensor device. Such a functional component, in particular a connection section thereof like a connection section of an actuator or a housing of a sensor device can also comprise a counter-bearing device with a counter-bearing surface for attaching the actuator or the sensor, respectively, to the base body according to the invention.

The rod-shaped base body according to the invention is manufactured from a fibre composite material, particularly carbon-fibre-reinforced plastic. In particular, the rod-shaped base body is exclusively made of a fibre composite material, particularly carbon-fibre-reinforced plastic. In another embodiment of the invention, the base body according to the invention can additionally be produced as one part or one piece and especially of fibre composite material or carbon-fibre-reinforced plastic. Thereby, a high accuracy of the form of the rod-shaped base body according to the invention and in particular of the bearing device provided thereon can be assured.

With regard to the form of the base body according to the invention, the bearing device can be formed as a protrusion or indentation of the outer shape of the base body according to the invention. The indentation can also be a recess. In an embodiment of the base body according to the invention, each bearing device of the rod-shaped base body is generally defined by an arrangement of bearing surfaces in the shape of abutment surfaces or bearing surfaces in the shape of abutment sections with at least two of the bearing surfaces or abutment surfaces and bearing surfaces or abutment sections, respectively, lying opposite to each other. In this regard "lying opposite to each other" means that there are at least sections or areas of the respective bearing surface which allow a form-fit with corresponding bearing surfaces of a bearing device of an object which is clamped to the rod-shaped base body by a clamping or is connected to the rod-shaped base body by fastening means. This term can in particular mean that the surface normals of these sections or areas of the respective bearing surface of an object include an angle of at least 45 degrees.

Such a shape of the bearing surfaces of each of the at last one bearing device of the rod-shaped base body is designed for a form-fitting co-acting with an appropriate bearing device of a functional component which is connected or clamped to the base body according to the invention. Accordingly, if the bearing device of the base body according to the invention is formed as a protrusion or an indentation, the bearing device of the functional component to be attached to the base body according to the invention has the shape of an indentation and a protrusion, respectively.

In an embodiment of the base body according to the invention there is a plurality of bearing devices disposed in a distance from each other along a longitudinal direction of the rod-shaped base body so that they are distributed over the base body in its longitudinal direction. In a further embodiment of the base body according to the invention the bearing devices can be regularly distributed lengthwise along the longitudinal direction of the rod-shaped base body so that there is the same distance between at least the majority of pairs of respectively adjacent bearing devices lying next to each other when seen in the longitudinal direction of the base body.

The bearing surfaces of a bearing device of the rod-shaped base body serves as a positioning mark, as it provides at least one bearing surface for forming a positive fit with at least one counter-bearing surface of the further base body and/or the functional component, in order to determine the position of the further base body and/or the functional component in relation to the rod-shaped base body in the framework by means of a positive engagement by means of the at least one bearing surface and at least one counter-bearing surface, which bear against one another. With the base body according to the invention, a high accuracy can be provided for the bearing surfaces of the base body on the same. At the same time, the base body can be produced at rather low costs and in an efficient manner as it is designed appropriately to be used as a standard product.

Generally, the bearing device of an object or functional component to be attached to the base body according to the invention, may be a separate component as a connecting piece or part of the functional component. The functional components may be e.g. toggle-lever clamping devices, suction devices, centring pins, sensors, welding devices, clinching devices, riveting devices, robot arms or the like. The bearing surfaces of the positioning marks may be formed by means of depressions which have been introduced into the outer surface of the rod-shaped base body, e.g. by shaping without material removal or by removing material, such as e.g. by drilling or milling. The bearing surfaces form a positive connection together with the corresponding counter-bearing surfaces of the bearing devices, wherein further sections of the bearing device in turn form a positive connection together with counter-bearing surfaces of a further base body or a functional component or also other fastening elements. Thus, the positioning marks reliably prevent an undesired displacement of two mutually connected rod-shaped base bodies or a functional component connected to a rod-shaped base body and increase the positional accuracy. A plurality of discrete positions can be selected due to the plurality of positioning marks, so that two rod-shaped base bodies can be coupled to one another and/or a rod-shaped base body can be coupled to a functional component in different planes and/or at different angles. Thus, the rod-shaped base body allows the construction of frameworks with a reduced unladen weight by choosing fibre-composite material as the material and improved positional accuracy by means of the positioning marks forming a positive engagement, wherein settling processes are shortened in the case of dynamic load and undesired displacements due to dynamic loads are excluded by means of the positive engagement.

According to a first preferred embodiment, provision is made for the at least one bearing surface to be formed by means of a shaped section of the rod-shaped base body. In this case, a formed section is understood to mean a part of the rod-shaped base body, the thickness or diameter of which is smaller or greater than the other section of the rod-shaped base body which extends along the longitudinal direction thereof on both sides of the respective bearing device. Preferably, the bearing surface or the shaped section of the rod-shaped base body runs in the circumferential direction of the base body according to the invention. In an embodiment of the base body according to the invention, the rod-shaped base body has an essentially hollow or hollow cylindrical shape, and when further the bearing device is formed as an indentation of the outer shape of the rod-shaped base body, the same can have a smaller wall thickness in the region of the shaped section than in other regions. Vivce versa, the rod-shaped base body can have a greater wall thickness in the region of the shaped section than in other regions, when the rod-shaped base body has a hollow or hollow cylindrical shape and when further the bearing device is formed as a protrusion of the outer shape of the rod-shaped base body.

Preferably, the shaped section is a bead which annularly runs around a main axis of extension of the essentially cylindrical or square rod-shaped base body, wherein boundary surfaces of the bead in each case form at least one of the bearing surfaces which interact with one counter-bearing surface in each case. The rod-shaped base body has a main axis of extension, in the direction of which its dimension is larger than in the direction of axes which are arranged at right angles to the main axis of extension. That is to say, the length of the rod-shaped base body in the direction of the main axis of extension is larger than the height, width or diameter thereof. In this case, the main axis of extension runs through the centre of gravity of the rod-shaped base body. In order to obtain a particularly reliably acting positive connection, the bead can have a depth which is larger than the width of the bead.

Further, provision is preferably provided for at least one of the boundary surfaces of the bead to form at least one stop surface which, whilst bearing against one counter-contact surface of the at least one counter-bearing surface in each case, fixes the position of a bearing device connected to the rod-shaped base body along a main axis of extension of the rod-shaped base body. Thus, by means of positive engagement, the stop surface and counter-stop surface, which are bearing against one another, block an undesired displacement in the direction of the main axis of extension of the rod-shaped base body. To this end, the stop surfaces can e.g. be arranged at right angles to the direction of the main axis of extension, which in the assembled state, i.e. using bearing devices connected to a framework, is in contact with counter-stop surfaces which are assigned to the bearing devices. By providing two mutually opposite stop surfaces which are arranged parallel to one another and at a minimum spacing from one another, a positive engagement acting in both directions along the main axis of extension can be formed. Fixing along further axes can take place by means of non-positive engagement.

In order to also reliably prevent an undesired displacement along the further axes, provision is preferably made for the boundary surfaces of the bead to form a contact surface which, whilst bearing against a counter-contact surface of the at least one counter-bearing surface, fixes the angular position of a bearing device connected to the rod-shaped base body with respect to an axis of rotation of the rod-shaped base body running parallel to the main axis of extension. In this case, the main axis of extension and axis of rotation may coincide. The positioning mark may be formed e.g. by means of contact surfaces which are arranged at right angles to the axis of rotation. Further, the contact surfaces can be arranged at right angles to the stop surfaces. In the assembled state, counter-contact surfaces of bearing devices are in contact with the contact surfaces. Thus, the position of the further base body and/or the functional component is determined completely by means of positive engagement, wherein an angular position in relation to the rod-shaped base body is determined by means of the determination along an axis of rotation.

In the region of the bead, the rod-shaped base body may have a circular cross section. In this case, the positioning marks can e.g. be constructed as annular grooves. The groove base is in this case a ring surface which forms the contact surface. Preferably, provision is made for the rod-shaped base body to have a polygonal cross section, particularly a triangular, hexagonal or octagonal cross section, arranged transversely to the main axis of extension of the rod-shaped base body at least in the region of the bead. That is to say, a plurality of essentially planar contact surfaces are arranged along their mutually opposite sides annularly around the main axis of extension of the rod-shaped base body, surrounding the same and adjoining one another, wherein the connected sides of the contact surfaces form the corners of the cross section. The contact surfaces may be rectangular, wherein two mutually opposite sides of the contact surfaces in each case are connected to mutually opposite sides of adjacent contact surfaces. By means of an angular offset of the plane of a contact surface to the plane of directly adjacent contact surfaces, a ring is thus created, which surrounds the main axis of extension. Further, the two other mutually opposite sides of a rectangular contact surface can be connected to the respective adjacent stop surfaces, e.g. at right angles. Preferably, eight contact surfaces with identical angular offset to the respectively adjacent contact surface are formed, of which one or a plurality are in contact with counter-contact surfaces of the bearing device. This allows a connection of a rod-shaped base body to a bearing device at four different angles and thus allows simple adaptation of a framework to the respective specifications.

The rod-shaped base body can have a circular or elliptical cross section in the remaining sections which do not belong to the beads. Preferably, provision is made for the rod-shaped base body to have an at least triangular cross section, particularly an octagonal cross section, in the remaining sections. By means of an e.g. octagonal cross section in the region of the beads and outside of the beads, the rod-shaped base body has surface sections in the region outside of the beads which may be parallel to the bearing surfaces. In the case of a hollow construction of the rod-shaped base body, the bearing surfaces in the beads therefore form regions of smaller wall thickness than in the other regions.

In this case, the contact surfaces between the corners may be flat surfaces. As an alternative to this, the contact surfaces can also be surfaces e.g. curved about an axis. In this case, the axis of curvature of the curved surface may run parallel to the main axis of extension or coincide with the same. Further, the connecting lines along the surface sections may be constructed as edges or corners, or the edges are constructed in a rounded manner and thus have a radius like the curved surfaces. In this case, a transition from a curved surface to a rounded surface is assumed if the value of the radius of the curved surfaces changes by more than 10%.

According to a second preferred embodiment, the shaped section is constructed as a spherical segment at least in sections, i.e. has a spherical inner surface section, the inner surface of which provides the bearing surface which interacts with a counter-bearing surface. In this case, a spherical segment is also understood to mean rotary bodies or parts of rotary bodies which are not circular, but rather elliptical. A closed line delimits the ball impression or surrounds the same. Accordingly, the counter-bearing surfaces are also constructed as spherical segments. In order to obtain a particularly reliably acting positive connection, the spherical segment can have a depth which is larger than the diameter of the spherical segment.

According to a third preferred embodiment, provision is made for the positioning mark to be a hole, the inner wall of which forms the bearing surface which interacts with the counter-bearing surface. The hole may have a circular, but also e.g. an oval or quadrilateral cross section. Further, the hole may also be constructed as a slot. Independently of the cross-sectional shape, the hole may be a blind hole if the rod-shaped base body is of massive construction, wherein a particularly stable rod-shaped base body is obtained by means of the massive shaping. Accordingly, the counter-bearing surfaces are also constructed as surfaces e.g. of a cylinder. In order to obtain a particularly reliably acting positive connection, the hole can have a depth which is larger than the width or the diameter of a circular hole. Preferably, provision is made for the rod-shaped base body to be hollow. Due to the hollow construction, a particularly lightweight rod-shaped base body is obtained. In the case of a hollow configuration of the rod-shaped base body, the hole is constructed as a passage which extends through the wall of an e.g. cylindrical rod-shaped base body. In order to reinforce the rod-shaped base body, a reinforcing structure may be arranged in the internal space of the hollow rod-shaped base body. This reinforcing structure may be formed during the extrusion of a rough part.

Further, a framework system having rod-shaped base body of this type is included in the invention. With a framework system of this type, a framework may be formed which has at least two rod-shaped base bodies connected to one another by means of a bearing device or a functional component connected to a rod-shaped base body by means of a bearing device. In this case, the framework system may only have rod-shaped base bodies or preferably be supplemented with a bearing device of this type.

The object of the invention is further achieved by means of a method for producing a rod-shaped base body with at least one bearing surface which can be brought to bear against at least one counter-bearing surface of a bearing device for fastening to a further rod-shaped base body and/or a functional component for forming a framework, comprising the steps:

Manufacturing the rod-shaped base body from a fibre-composite material, particularly fibre-reinforced plastic, with the sub-steps:

Providing the rod-shaped base body with a positioning mark which determines the position of the further base body and/or the functional component in relation to the rod-shaped base body in the framework by means of the positive engagement due to the at least one bearing surface and at least one counter-bearing surface which are bearing against one another, and Curing of the matrix of the fibre-composite material.

The functional components may be e.g. toggle-lever clamping devices, suction devices, centring pins, sensors, welding devices, clinching devices, riveting devices, robot arms or the like. The rod-shaped base body is produced from a fibre-composite material which contains fibres embedded in a matrix made up of a curable plastic. The fibres can be e.g. basalt, boron, glass, ceramic or siliceous fibres, or also metal fibres, such as e.g. steel fibres. Organic fibres can also be used, such as e.g. aramid, carbon, polyester, nylon, polyethylene or plexiglass fibres. Polymers are used as matrix, e.g. thermoset plastics (Duroplastic), epoxy resin or thermoplastics. Carbon fibres are used in order to achieve a particularly low unladen weight with high rigidity. To produce the rod-shaped base body, a rough part is created, e.g. by extrusion of a plastic compound containing carbon fibres, which is shaped before the curing of the plastic matrix to form the positioning marks.

The positioning marks can be produced particularly simply if the at least one bearing surface is formed by shaping with a stamp of a press tool. This allows the manufacturing of the rod-shaped base body in just two steps, namely a shaping step, followed by a curing step. No material is removed during the shaping and thus there is no material loss.

Preferably, a bead is formed by the shaping, which particularly runs annularly around a main axis of extension of the rod-shaped base body, wherein boundary surfaces of the bead form at least one of the bearing surfaces which interact with a counter-bearing surface. In order to obtain a particularly reliably acting positive connection, beads can be introduced which have a depth which is larger than the width of the beads.

Further, a spherical segment can preferably be formed by means of the shaping, the internal surface of which forms the bearing surface which interacts with a counter-bearing surface. In this case, a closed line delimits the ball impression or surrounds the same. In order to obtain a particularly reliably acting positive connection, a ball impression with a depth which is larger than the diameter of the ball impression can be created.

According to an alternative embodiment of the method, to provide the rod-shaped base body with the positioning hole, a hole is preferably formed, wherein the inner wall forms the bearing surface which interacts with the counter-bearing surface. In this case, the hole can be produced using a winding reel with an arbor, on which in a winding step, fibres of the fibre-reinforced plastic are wound up or a preform made up of fibres is applied. The construction of the at least one hole can therefore in particular be produced by:

Laying at least one layer of reinforcing fibres on the outer side of a winding reel for forming an outer wall of the rod-shaped base body to be produced, wherein at least one arbor for forming the hole in the rod-shaped base body to be produced is arranged on the outer side of the winding reel, Applying a matrix material in layers on the outer side of a winding reel in the region of the laid reinforcing fibres to construct an outer wall of the rod-shaped base body to be produced, Curing the layer made up of matrix material and reinforcing fibres, particularly by means of the influence of pressure and/or temperature, Removing the at least one arbor from the winding reel and separating the cured layer made up of matrix material and reinforcing fibres from the winding reel.

Following the application of the matrix material, that is to say of resin or plastic in particular, the subsequent curing of the matrix material and the removal of the at least one arbor from the winding reel, a rod-shaped base body made up of fibre-reinforced plastic is obtained, the fibres of which are not interrupted in the region of the hole by subsequent introduction of e.g. holes and thus reduce the strength, but rather run around the respectively created hole, as the fibres were redirected in a production step by the respective arbor. In this case, a blind hole is created if the rod-shaped base body is of massive construction, wherein a particularly stable rod-shaped base body is obtained by means of the massive configuration. In order to obtain a particularly reliably acting positive connection between the rod-shaped base body produced and the respective bearing device, the hole can have a depth which is larger than the width or the diameter of a circular hole. Further, provision is made for the rod-shaped base body to of hollow construction. Due to the hollow construction, a particularly lightweight rod-shaped base body is obtained. In the case of a hollow configuration of the rod-shaped base body, a passage is formed along the longitudinal axis of extension of the base body, which extends through the wall of a rod-shaped and e.g. cylindrical base body.

In order to additionally reinforce or stiffen a rod-shaped base body of hollow construction, provision may be made for a reinforcing structure to additionally be connected to the inner surface forming the internal space of the hollow rod-shaped base body. This reinforcing structure can be formed during the extrusion of a rough part, from which the rod-shaped base body is later manufactured.

BRIEF DESCRIPTION OF THE DRAWINGS

In the following, exemplary embodiments of the invention are described on the basis of the attached figures, wherein the figures are not true-to-scale illustrations. In the figures.

DETAILED DESCRIPTION

In an exemplary embodiment of the invention, apparatus and method described hereinabove are particularly designed for building a framework system and also for arranging a functional component. The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. Specifically, features described in the context of a method can be used to characterize an apparatus and features described in the context of an apparatus can be used to characterize a method. The scope of the invention is limited only by the following claims. In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb. All publications and/or patents and/or product descriptions cited in this document are fully incorporated herein by reference to the same extent as if each had been individually incorporated herein by reference.

Figure 1:
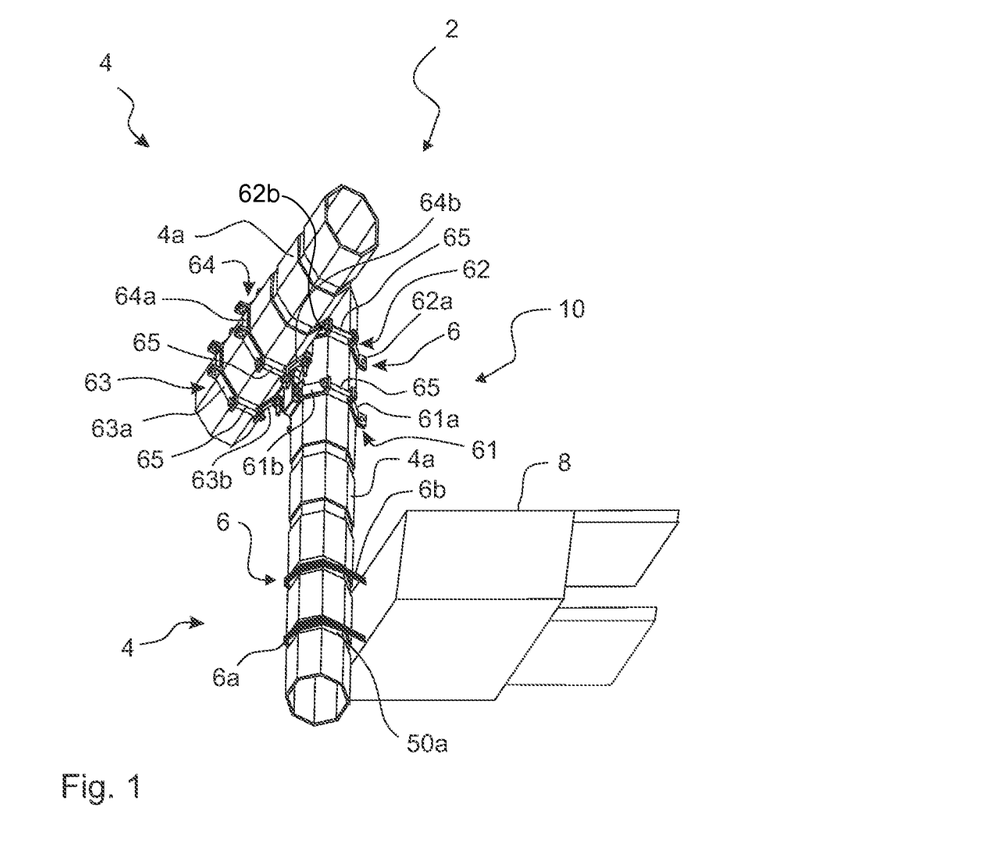
FIG. 1 shows a schematic illustration of a framework which has two rod-shaped base bodies according to a first exemplary embodiment of the invention which are connected to each other by a fastening device.

Reference is initially made to FIG. 1.

Illustrated is a framework device 10 which forms a framework system 2 according to the invention. The framework system 2 generally comprises at least one rod-shaped base body 4a according to the invention and at least one functional component attached thereto by at least one fastening device 6. In the embodiment shown in FIG. 1 the at least one functional component comprises a first functional component in form of a further rod-shaped base body 4a' and a second functional component 8 in form of a rack. The two rod-shaped base bodies 4a, 4a' are attached or mounted to each other by two fastening devices 6. Generally, the base body 4a can be connected to one another or one of the rod-shaped base bodies 4a, 4a' can be connected to a functional component 8 by a fastening device. The fastening device 6 can be realized as a toggle-lever clamping device, as a suction device, centering pin, sensor, welding device, clinch device, riveting device, robot arm or the like.

In the embodiment shown in FIG. 1, each of the fastening devices 6 for attachment of the functional component to the base body 4a is realized as a band or belt or band-like element 6a, 6b, each of which is mounted with both ends to the functional component 8. Each band-like element 6a, 6b has a bearing device with a bearing surface which is formed at least sectionally at each of the band-like element 6a, 6b and which is formed form-fit with the bearing surface 50a of the rod-shaped base body 4a. Each of the fastening devices comprise a clamping device or tensioning device which tensions the band-like element 6a, 6b towards an outer wall of the functional component 8 which lies adjacent to the base body 4a and thereby tightens the functional element 8 to the base body 4a. Thereby the functional element 8 is positioned accurately to the base body 4a.

The fastening device 6 by which the base bodies 4a and 4b are attached to each other comprises two clamping devices 61, 62 for attachment of their respective bearing device with a bearing surface to the respective bearing surface 50a of a first base body 4a, two clamping devices 63, 64 for attachment of their respective bearing device with a bearing surface to the respective bearing surface 50a of a second base body 4b.

Each of the clamping devices 61, 62, 63, 64 comprise at least one bracket which is attached to the respective base bodies 4a and 4b by a tensioning device or a clamping device. In the embodiment of the clamping devices 61, 62, 63, 64 shown in FIG. 1, each of the clamping devices 61, 62, 63, 64 comprise two brackets 61a, 61b and 62a, 62b and 63a, 63b and 64a, 64b, respectively, which are mounted by a tensioning device or a clamping device to each other. According to the embodiment shown in FIG. 1, the tensioning device is realized by connecting elements 65 like bolts by which the respective brackets are mounted to each other while at the same time the respective base body 4a and 4b is clamped between the respective brackets 61a, 61b and 62a, 62b and 63a, 63b and 64a, 64b, respectively.

In the embodiment of the fastening device 6 for fastening the base bodies 4a and 4b shown in FIG. 1, two of the brackets of each fastening device 6 are, and generally at least one bracket is connected to a connecting device 65 so that two clamping devices are attached to each other.

Generally according to the invention the fastening device 6 can be realized by at least one embodiment or a combination of the embodiments of the fasting device described herein.

The framework device 10 illustrated in FIG. 1 comprises two rod-shaped base bodies 4a, 4a' which are connected to one another by means of two fastening devices 6. Further, the rod-shaped base body 4a is connected to a functional component 8 via two further fastening devices 6. A framework system 2 can be provided with a functional component 8 which can be a positioning or holding device and/or a suction and welding device e.g. in order to position metal sheets to be welded and to weld the some to one another, e.g. in the context of automotive manufacturing. To this end, a high positional accuracy of the functional component 8 is required, i.e. even in the case of dynamic loads, the functional component 8 must remain in its position. Further, rapid damping of vibration processes within the framework 10, which are caused by dynamic loads, is necessary so that weld points can be successively placed precisely and quickly using a welding device as functional component 8. High positional accuracy and rapid damping of vibration processes counteract the weight of the framework 10 or the components thereof and the reliability of the connection formed with the bearing device 6, however. In order to accelerate the damping of vibration processes, provision is made for manufacturing the rod-shaped base body 4a from particularly lightweight fibre-composite material, particularly carbon-fibre-reinforced plastic, wherein the positional accuracy is increased by means of positive connections.

Figure 2:
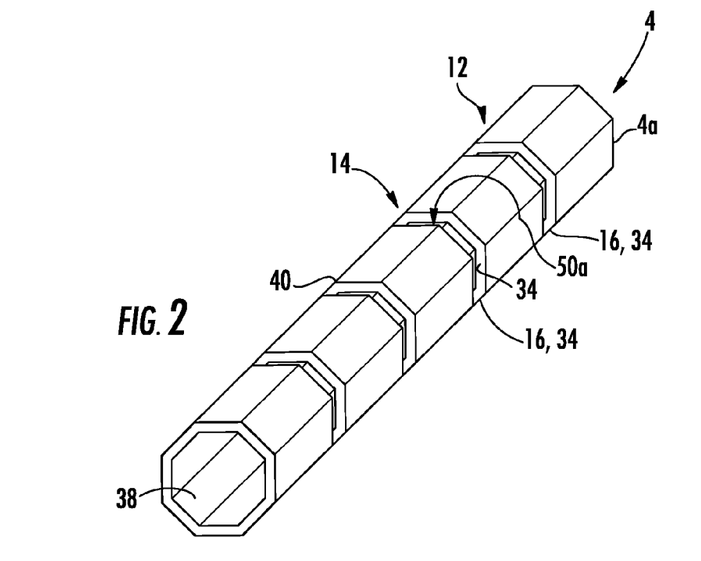
FIG. 2 shows a perspective illustration of an embodiment of a rod-shaped base body according to FIG. 1.
Figure 3:
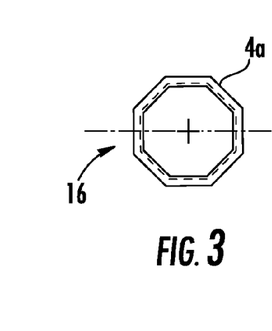
FIG. 3 shows a cross-sectional illustration of an embodiment of the rod-shaped base body according to FIG. 2.
Figure 4:
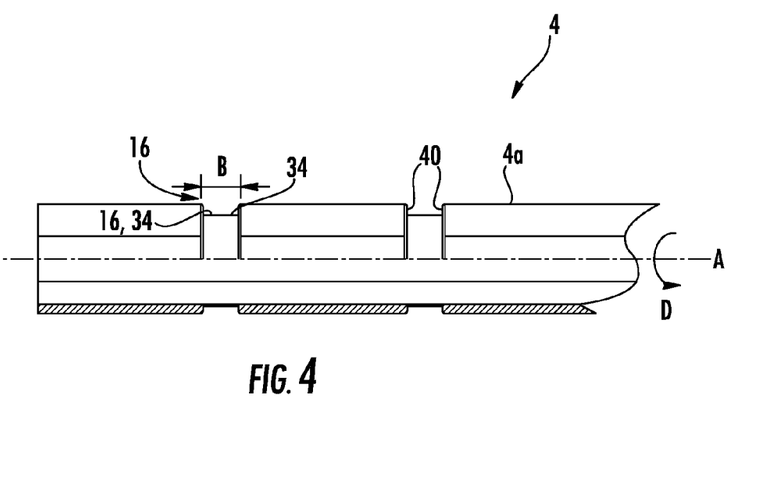
FIG. 4 shows a longitudinal section through an embodiment of the rod-shaped base body according to FIG. 2.

A first exemplary embodiment of the base body 4a according to the invention is now explained on the basis of FIGS. 2 to 4.

The rod-shaped base body 4a according to the first exemplary embodiment has an octagonal cross section and is constructed in a hollow manner in the interior thereof, i.e. the interior of the rod-shaped base body 4a has an internal space 38.

The outer side of the rod-shaped base body 4a is provided with a plurality of beads 16 which as recesses form positioning marks 12 which produce positive engagement. In the present exemplary embodiment, the beads 16 are arranged at the same distance from one another, specifically in the direction of a main axis of extension A which runs in the direction of the largest extent of the rod-shaped base body 4a. The beads 16 have a width B in the direction of the main axis of extension A.

The beads 16 run annularly around the outer side of the rod-shaped base body 4a. In the region of the beads 16, the wall thickness of the rod-shaped base body 4a is smaller in contrast to the remaining regions of the rod-shaped base body 4a. Thus, the beads 16 are shaped sections 14 of the rod-shaped base body 4a.

The bottom regions of the beads 16 are in the present exemplary embodiment constructed as planar surfaces and form bearing surfaces 50a. These flat surfaces form eight contact surfaces 34 for interaction with the bearing devices 6 for forming a positive engagement, as is explained later with reference to the FIGS. 8 to 15. In the present exemplary embodiment, these eight contact surfaces 34 are arranged along their mutually opposite sides annularly around the main axis of extension A of the rod-shaped base body 4, surrounding the same and adjoining one another. To this end, e.g. the contact surfaces 34 may be rectangular, wherein two mutually opposite sides in each case are connected to mutually opposite sides of adjacent contact surfaces 34. By means of an angular offset of the plane of a contact surface 34 to the plane of respective adjacent contact surfaces 34, a ring is thus created, which surrounds the main axis of extension A. Further, the bearing surfaces 50a of the rod-shaped base body 4a comprise stop surfaces 40 arranged between the outer sides of the rod-shaped base body and the contact surfaces 34, which are arranged at right angles to the contact surfaces 34. As is likewise described later with reference to the FIGS. 8 to 15, in interaction with counter-bearing surfaces of the bearing devices 6, the stop surfaces 40 increase the positional accuracy of the respective bearing devices 6 at the base body 4a by forming a positive engagement.

Figure 5:
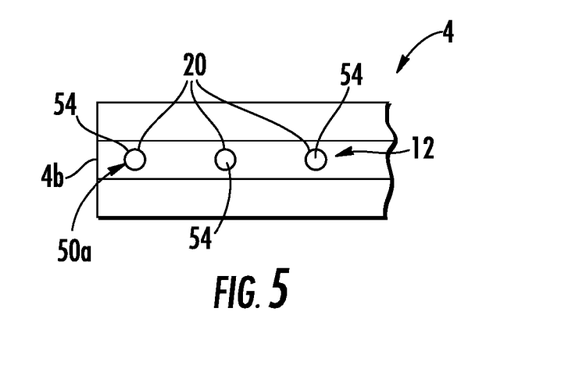
FIG. 5 shows a section of a rod-shaped base body according to a further exemplary embodiment of the invention.

A second exemplary embodiment of the base body 4b according to the invention is now explained on the basis of FIG. 5.

The rod-shaped base body 4b according to the second exemplary embodiment likewise has an octagonal cross section and is likewise constructed in a hollow manner in the interior thereof.

By contrast with the first exemplary embodiment, the rod-shaped base body 4b according to the second exemplary embodiment does not have any sections 14 shaped to form beads 16, but rather the shaped sections 14 are formed by ball impressions which have the shape of spherical segments 20 and which are used as positioning marks 12 which produce positive engagement. The spherical segments 20 therefore have the shape of a spherical section which is created when a ball is pressed into a ductile compound. In this exemplary embodiment, the inner surface of the spherical segment 20 constitutes the bearing surface 50a which interacts with a counter-bearing surface of a bearing device 6.

Figure 6:
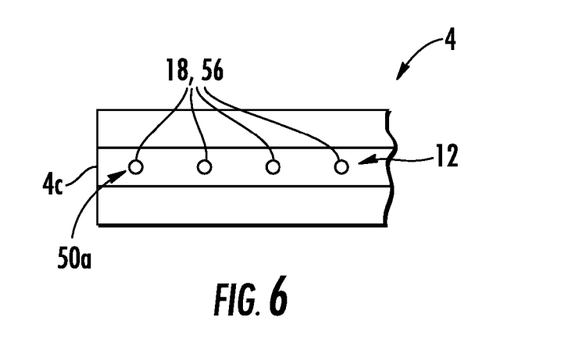
FIG. 6 shows a section of a rod-shaped base body according to a further exemplary embodiment of the invention.

A third exemplary embodiment of the base body 4c according to the invention is now explained on the basis of FIG. 6.

By contrast with the first two exemplary embodiments, the rod-shaped base body 4c according to a third exemplary embodiment does not have any shaped sections 14, but rather is provided with a plurality of holes 18 which are used as positioning marks 12 which produce positive engagement and extend from the outer side of the rod-shaped base body 4c to into the internal space 38 of the hollow rod-shaped base body 4c, i.e. in the present exemplary embodiment, the holes 18 are through holes which penetrate the wall of the hollow rod-shaped base body 4c. In this exemplary embodiment, the inner wall of the hole 18 constitutes the bearing surface 50a which interacts with a counter-bearing surface of a bearing device 6.

A first exemplary embodiment of the method for producing the rod-shaped base body 4a (see FIGS. 2 to 4) according to the first exemplary embodiment and the rod-shaped base body 4b (see FIG. 5) according to the second exemplary embodiment is now explained. The base body 4b can be produced from a fibre-composite material which in the present exemplary embodiment is a carbon-fibre-reinforced plastic which contains reinforcing fibres and particularly carbon fibres embedded in a plastic matrix.

The hollow rod-shaped base body 4a, 4b is in particular produced by a rough part being produced in a first step by means of extrusion from uncured plastic, to which carbon fibres are added. In a second step, the rough part is shaped in such a manner that it has on the one hand the octagonal cross section and on the other hand the shaped sections 14, i.e. beads 16 or spherical segments 20.

This shaping can take place in a separate production step before the curing of the plastic matrix, e.g. in an autoclave. A separate stamp is used in this prior shaping. In an alternative method, provision is made for this shaping to be undertaken during the curing of the plastic matrix in a heatable press. To this end, the press can have a corresponding stamp. Further, the curing can also be carried out in the RTM (Resin Transfer Moulding) method. As a result of the first exemplary embodiment of the production method according to the invention, a rod-shaped base body 4a, 4b is provided, which has no fibres separated by the production of the shaped sections 14, which would impair the mechanical characteristic, but rather a rod-shaped base body 4a, 4b is provided, which has a smaller unladen weight and has a positional accuracy in the framework 10 which is increased by means of the positioning marks 12.

Figure 7:
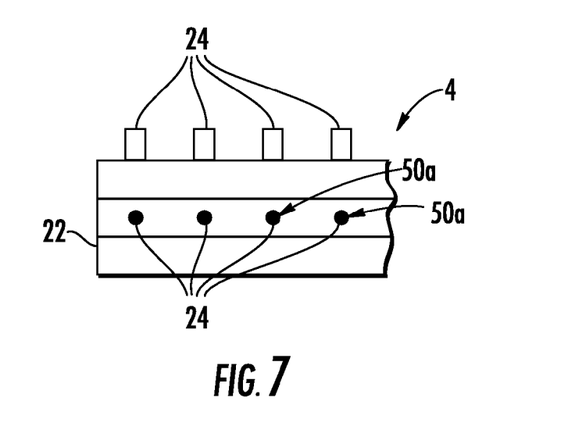
FIG. 7 shows a winding arbor for carrying out an exemplary embodiment of a method according to the invention for producing the rod-shaped base body according to the embodiment of the invention according to FIG. 6.
Figure 8:
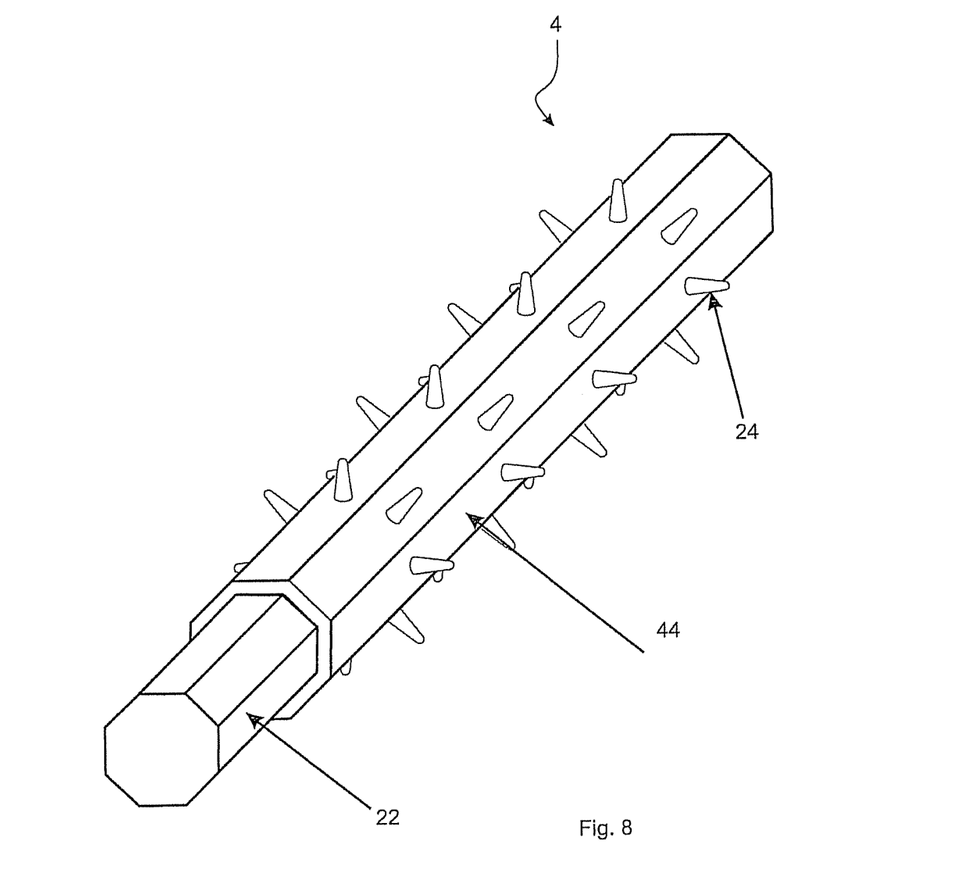
FIG. 8 shows the use of the winding arbor of FIG. 7 for producing the rod-shaped base body according to the third exemplary embodiment of the invention.
Figure 9:
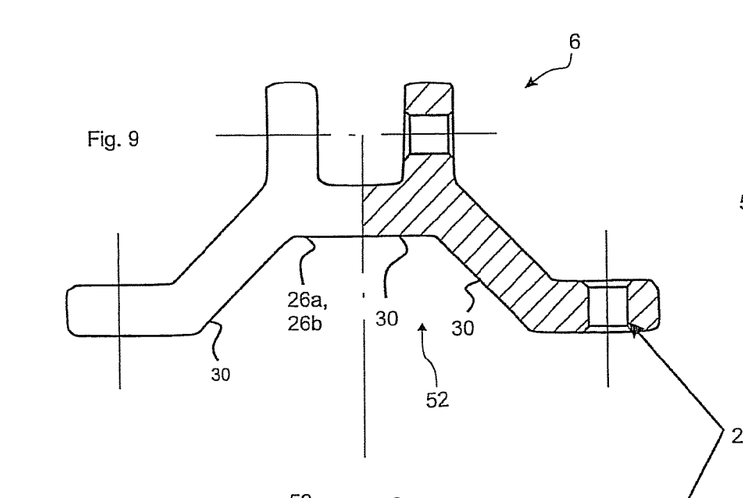
FIG. 9 shows a first view—partially cut away—of an exemplary embodiment according to the invention of a half shell provided as bearing device.
Figure 10:
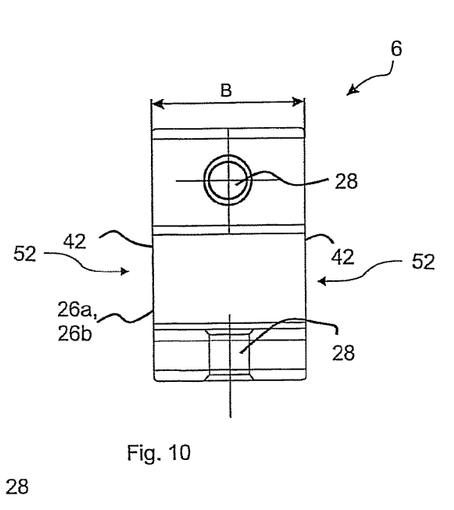
FIG. 10 shows a side view of the half shell according to FIG. 9.
Figure 11:
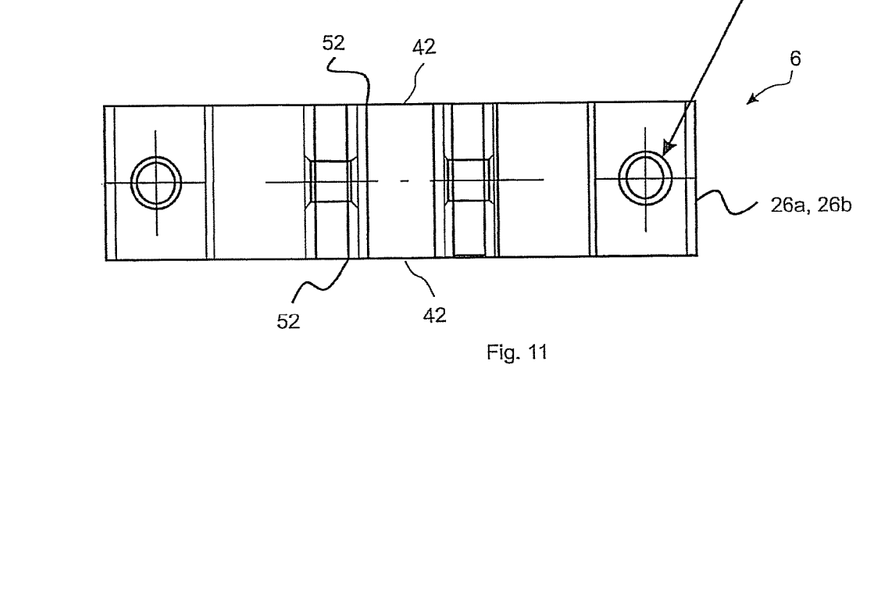
FIG. 11 shows a plan view of the half shell according to FIG. 9.
Figure 12:
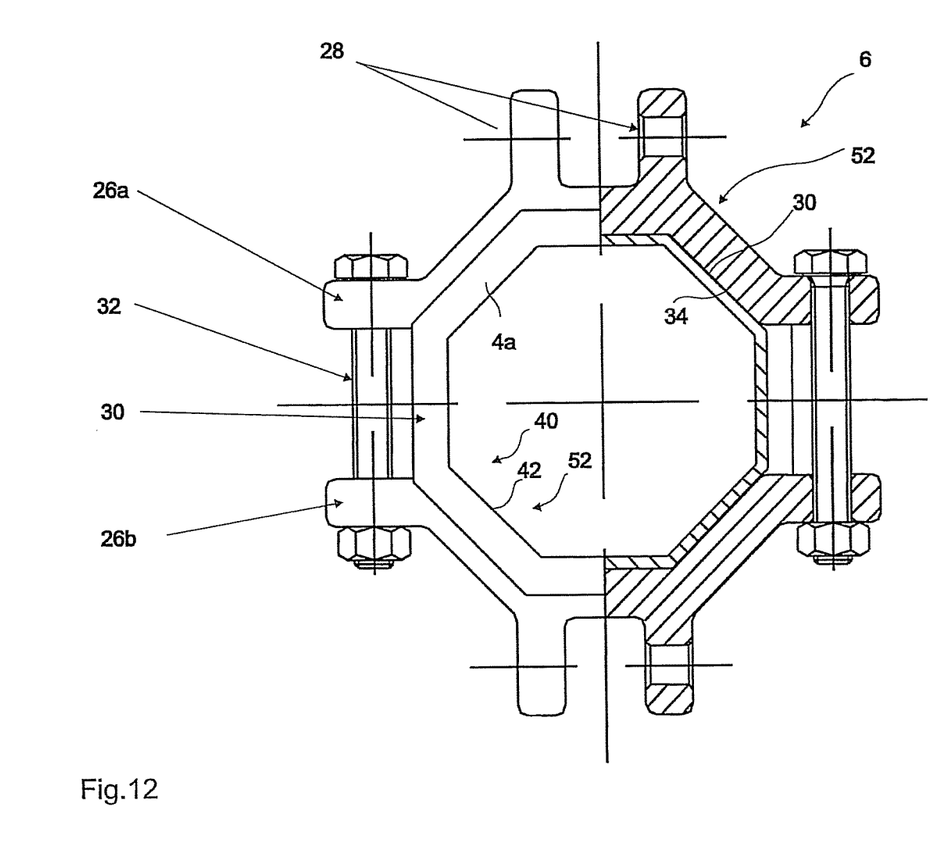
FIG. 12 shows an illustration of a clamp formed from two half shells, which is connected to an embodiment of a rod-shaped base body according to the invention.
Figure 13:
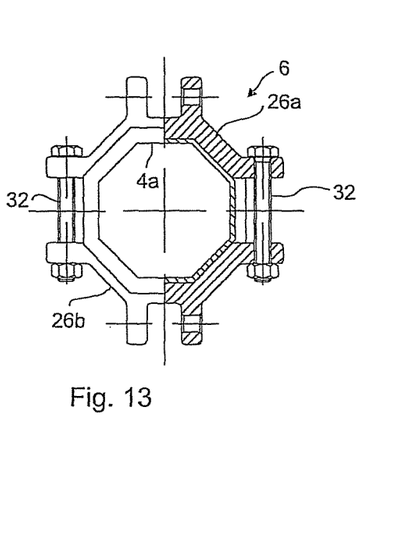
FIG. 13 shows an illustration of a clamp connected at a first angle to an embodiment of a rod-shaped base body according to the invention.
Figure 14:
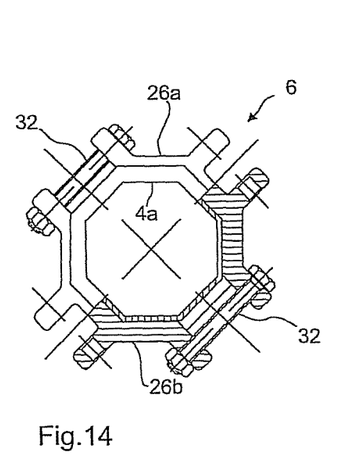
FIG. 14 shows an illustration of a clamp connected at a second angle to an embodiment of a rod-shaped base body according to the invention.
Figure 15:
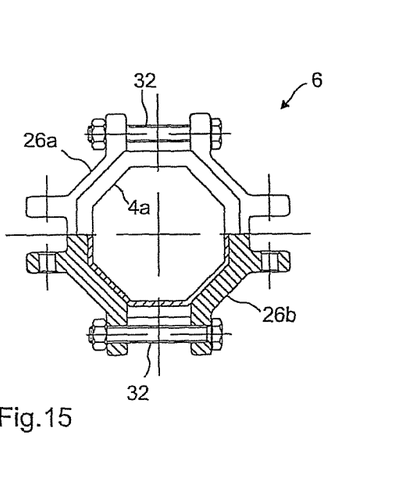
FIG. 15 shows an illustration of a clamp connected at a third angle to an embodiment of a rod-shaped base body according to the invention.
Figure 16:
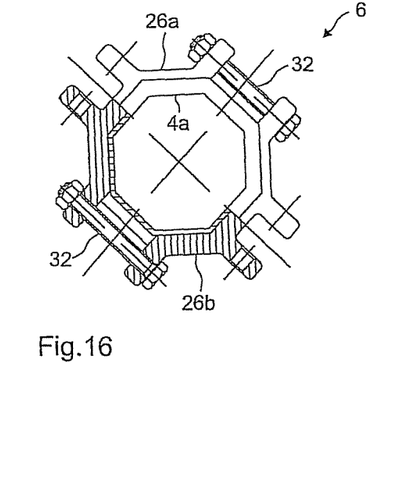
FIG. 16 shows an illustration of a clamp connected at a fourth angle to an embodiment of a rod-shaped base body according to the invention.

A second exemplary embodiment of the method for producing the rod-shaped base body 4c (see FIG. 6) according to the third exemplary embodiment of the same is now explained on the basis of FIGS. 7 and 8. In this second embodiment also, a base body 4c is used, which is made out of a fibre-reinforced plastic which contains reinforcing fibres and in particular carbon fibres embedded in a matrix-material layer.

To produce the hollow rod-shaped base body 4c according to the third exemplary embodiment, a winding reel 22 is used. The winding reel 22 has a plurality of arbors 24 which are releasably connected, e.g. by means of a thread, to the winding reel 22.

Reinforcing fibres and in particular carbon fibres are then applied in a first step to the winding reel 22 provided with arbors 24 in the form of an in particular layer-like preform 44 which comprises e.g. of a web containing reinforcing fibres and in particular carbon fibres. Here, the reinforcing fibres are arranged in such a manner that the same surround the arbors 24, as these protrude through the layer-like preform 44. That is to say the arbors 24 are braided by the reinforcing fibres in that the same are locally redirected by the arbors 24. As a result of this braiding or redirecting, in the region of the arbors 24, i.e. e.g. in a region which is three-times as large as the hole, that is to say in the case of a circular hole a region with a triple diameter, the orientation of the reinforcing fibres of the preform 44 deviates in this region from the remaining regions of the preform 44. That is to say there are therefore regions of the preform 44 which differ in terms of the fibre orientation of their respective reinforcing fibres. Further, regions adjoining the respective arbors may be formed by the braiding or redirection, in which the fibre density is larger than before the braiding or redirection, i.e. due to the braiding or redirection, the preform 44 has a region with an increased fibre density next to a region with the original fibre density.

Subsequently, in a second step, an application takes place of a matrix material in layers on the outer side of a winding reel 22 in the region of the laid reinforcing fibres to construct an outer wall of the rod-shaped base body 4a, 4b, 4c to be produced, i.e. an application of plastic which forms the plastic matrix of the carbon-fibre-reinforced plastic. After the layer made up of matrix material and reinforcing fibres has been cured in a further step, the arbors 24 are subsequently separated from the winding reel 22 and removed. Subsequently, the winding reel 22 is pulled out of the hollow rod-shaped base body 4c, so that as a result of the second exemplary embodiment of the production method according to the invention, a rod-shaped base body 4c is provided, which has no separated fibres which would impair the mechanical characteristic, but rather a rod-shaped base body 4c is provided, which has a smaller unladen weight and has a positional accuracy which is increased by means of the positioning marks.

The structure of the bearing device 6 and the interaction thereof with the rod-shaped base body 4a according to the first exemplary embodiment is now explained with reference in addition to FIGS. 9 to 16.

In the present exemplary embodiment, the bearing devices 6 are constructed as clamps. They comprise two identical half shells 26a, 26b. The half shells 26a, 26b may be manufactured from a metallic material, such as e.g. aluminium or high-grade steel, from plastic or also from a fibre-reinforced plastic, such as e.g. carbon-fibre-reinforced plastic. Each of the half shells 26a, 26b has locating holes 28, through which the tensioning screws 32 (see FIG. 12) can be guided in order to connect the two half shells 26a, 26b to one another. Furthermore, further locating holes 28 are provided, using which functional components 8 can be fastened on the bearing devices 6. The half shells 26a, 26b essentially have a width which corresponds to the width B of the beads 16 (see FIG. 4), so that the half shells 26a, 26b can be inserted into the beads 16 in certain sections.

The half shells 26a, 26b each have a counter-bearing surface 52 which in the present exemplary embodiment has three counter-contact surfaces 30 in each case. These counter-contact surfaces 30 are constructed in such a manner that they are in contact with three of the eight contact surfaces 34 of the rod-shaped base body 4a (see FIGS. 2 to 4) when the half shells 26a, 26b are inserted into the beads 16, as FIGS. 12 to 16 show.

Further, the counter-bearing surface 52 of the half shells 26a, 26b has counter-stop surfaces 42 which are arranged at right angles to the counter-contact surfaces 30. The counter-stop surfaces 42 are likewise in contact with the stop surfaces 34 of the rod-shaped base body 4a (see FIGS. 2 to 4) when the half shells 26a, 26b are inserted into the beads 16, as FIGS. 12 to 16 also show.

In order to form a framework 10, that is to say to connect two rod-shaped base bodies 4a, 4a' to one another or a rod-shaped base body 4a according to the first exemplary embodiment (see FIGS. 2 to 4) to a functional component 8, two half shells 26a, 26b are arranged in one of the beads 16 in such a manner that in each case three of the counter-contact surfaces 30 of one of the half shells 26a, 26b bear against three of the eight contact surfaces 34 of the rod-shaped base body 4a.

In a next step, tensioning screws 32 are passed through the locating holes 28 in order to connect the two half shells 26a, 26b to one another. In this position, the stop surfaces of the rod-shaped base body 4a are perpendicular to the main axis of extension A and bear against the counter-stop surfaces 42 of the half shells 26a, 26b, so that an undesired displacement of a bearing device 6 in the direction of the main axis of extension A in relation to the rod-shaped base body 4a is reliably prevented by the positive engagement formed by the stop surface 40 and counter-stop surface 42. In the present exemplary embodiment, the stop surfaces 40 and counter-stop surfaces 42 are arranged at right angles to the direction of the main axis of extension A. The rod-shaped base body 4a and the half shells 26a, 26b each have two stop surfaces 40 and counter-stop surfaces 42 which in each case form a surface pair and thus prevent an undesired displacement in both directions along the main axis of extension A.

By means of the contact surfaces 34 of the rod-shaped base body 4a and counter-contact surfaces 30 of the half shells 26a, 26b, which are in contact, a second positive engagement is additionally formed, which reliably prevents a rotational movement of the half shells 26a, 26b in relation to the rod-shaped base body 4a around an axis of rotation D parallel to and coincident with the main axis of extension A. In the present exemplary embodiment, the contact surfaces 34 and counter-contact surfaces 30 are arranged at right angles to the direction of the axis of rotation D. The rod-shaped base body 4a and the half shells 26a, 26b therefore have contact surfaces 34 and counter-contact surfaces 30 which in each case form a surface pair and thus prevent an undesired displacement in both directions around the axis of rotation D.

Thus, by means of the first positive engagement formed by the stop surfaces 40 and counter-stop surfaces 42, and by means of the second positive engagement formed by the contact surfaces 34 and counter-contact surfaces 30, the positional accuracy of a framework 10 of this type is markedly increased.

In this case, on account of the regular octagonal construction of the rod-shaped base bodies 4a, 4b, 4c of all three exemplary embodiments, four different angular positions can be formed between the rod-shaped base bodies 4a, 4b, 4c and the bearing device 6, namely 0°, 45°, 90° and 135°, as FIGS. 13 to 16 show. Thus, two rod-shaped base bodies 4a, 4b, 4c can be connected to one another and/or a rod-shaped base body 4a, 4b, 4c can be connected to a functional component 8 at various angles.

If a framework 10 should be constructed using rod-shaped base bodies 4b according to the second exemplary embodiment (see FIG. 5), bearing devices 6 are used to this end, which as counter-bearing surfaces 50a have spherical sections corresponding to the spherical segments 20. In this exemplary embodiment, the spherical segments 20 correspond to the contact surfaces 34 and stop surfaces 40 of the first exemplary embodiment and form a first positive engagement in the direction of the main axis of extension A and in a second positive engagement around the axis of rotation D.

If a framework 10 should ultimately be constructed using rod-shaped base bodies 4c according to the third exemplary embodiment (see FIG. 6), bearing devices 6 are used to this end, which have pins corresponding to the holes 18, which engage into the holes 18. In this exemplary embodiment, the inner walls 56 of the holes 18 correspond to the contact surfaces 34 and stop surfaces 40 of the first exemplary embodiment. If, e.g. the holes 18 and the pins are of cylindrical construction, they in each case form a pair of coaxial cylinder surfaces. They form a first positive engagement in the direction of the main axis of extension A and in a second positive engagement around the axis of rotation.

Figure 17:
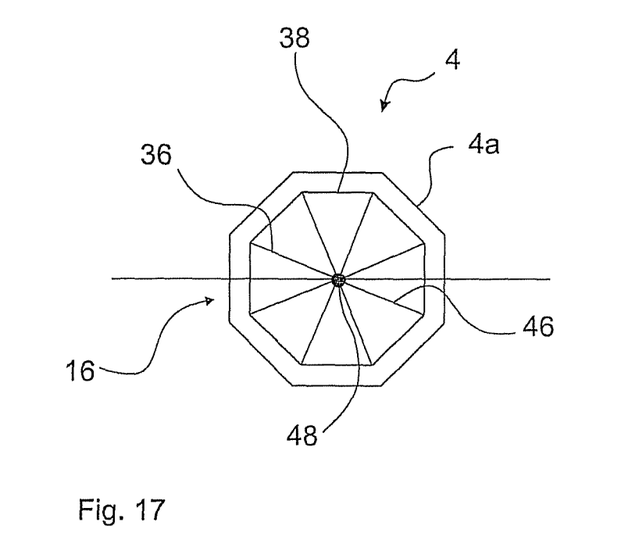
FIG. 17 shows an illustration of the internal space of an embodiment of a rod-shaped base body of hollow construction with a reinforcing structure.

Reference is now made to FIG. 17.

FIG. 17 shows a hollow rod-shaped base body 4a, 4b according to the first or second exemplary embodiment, in the internal space 38 of which a reinforcing structure 36 is arranged, which markedly improves the mechanical characteristics of the rod-shaped base body 4a, 4b. The reinforcing structure 36 has supporting struts 46 which extend from inner walls of the hollow rod-shaped base body 4a, 4b to a merging point 48. The reinforcing structure 36 can be produced without an additional manufacturing step when extruding a rough part, from which by curing of the plastic matrix, the rod-shaped base body 4a, 4b is produced.

It should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

REFERENCE LIST

2 Framework system
4a, 4a', 4b, 4c Base body
6 Bearing device
8 Functional component
10 Framework
12 Positioning mark
14 Shaped section
16 Bead
18 Hole
20 Spherical segment
22 Winding reel
24 Arbor
26a, 26b Half shell
28 Locating hole
30 Counter-contact surface
32 Tensioning screw
34 Contact surface
36 Reinforcing structure
38 Internal space
40 Stop surface
42 Counter-stop surface
44 Preform
46 Supporting strut
48 Merging point
50a Bearing surface
52 Counter-bearing surface
54 Inner surface
56 Inner wall
A Main axis of extension
B Width
D Axis of rotation

The invention claimed is:

1. A rod-shaped base body, particularly for arranging functional components, with at least one bearing surface which can be brought to bear against at least one counter-bearing surface of a bearing device of a connecting device for fastening a further rod-shaped base body and/or a functional component to the rod-shaped base body for forming a framework,
wherein the rod-shaped base body is produced from a fiber composite material, particularly carbon-fiber-reinforced plastic, and the rod-shaped base body has a recess as a positioning mark, which provides the at least one bearing surface for forming a positive fit with at least one counter-bearing surface of the further base body and/or the functional component,
wherein the bearing surface runs in a circumferential direction of the rod-shaped base body,
wherein the rod-shaped base body has a polygonal cross section, and
wherein the fiber composite material comprises a plurality of fibers, wherein fibers aligned with the recess extend around or under the recess without being interrupted by the recess.

2. The rod-shaped base body according to claim 1, wherein the at least one bearing surface is formed by a shaped section of the rod-shaped base body.

3. The base body according to claim 2, wherein the shaped section is a bead which in particular annularly runs around a main axis of extension of the rod-shaped base body, wherein at least one boundary surface of the bead forms at least one of the bearing surfaces which interacts with one counter-bearing surface.

4. The rod-shaped base body according to claim 3, wherein boundary surfaces of the bead form a stop surface which, while bearing against a counter-contact surface of the at least one counter-bearing surface, fixes a position of the bearing device connected to the rod-shaped base body along the main axis of extension of the rod-shaped base body.

5. The rod-shaped base body according to claim 3, wherein boundary surfaces of the bead form at least one stop surface which, while bearing against a counter-contact surface of the at least one counter-bearing surface, fixes and angular position of the bearing device connected to the rod-shaped base body with respect to an axis of rotation of the rod-shaped base body running parallel to the main axis of extension.

6. The rod-shaped base body according to claim 3, wherein the rod-shaped base body has a triangular, hexagonal or octagonal cross section arranged transversely to the main axis of extension of the rod-shaped base body, at least in a region of the bead.

7. The rod-shaped base body according to claim 2, wherein the shaped section is constructed as a spherical segment, an inner surface of which provides the bearing surface which interacts with the at least one counter-bearing surface.

8. The rod-shaped base body according to claim 1, wherein the positioning mark is a hole with an inner wall which provides the bearing surface which interacts with the counter-bearing surface.

9. A framework system for arranging functional components, in particular having a rod-shaped base body according to claim 1.

* * * * *